United States Patent [19]

Paquet et al.

[11] Patent Number: 4,613,111
[45] Date of Patent: Sep. 23, 1986

[54] VALVE WHICH IS OPENED BY REDUCED PRESSURE

[75] Inventors: Jean-Marc Paquet; René Sibuet, both of Annecy, France

[73] Assignee: Cit-Alcatel Compagnie Industrielle des Telecommunications

[21] Appl. No.: 683,543

[22] Filed: Dec. 19, 1984

[30] Foreign Application Priority Data

Dec. 22, 1983 [FR] France .................. 83 20576

[51] Int. Cl.⁴ ............................ F16K 51/02
[52] U.S. Cl. .................. 251/46; 251/30.01; 251/62
[58] Field of Search .......... 251/30, 46, 45, 62

[56] References Cited

U.S. PATENT DOCUMENTS

| | | | |
|---|---|---|---|
| 2,526,972 | 10/1950 | Ray | 251/46 X |
| 3,022,039 | 2/1962 | Cone et al. | 251/46 |
| 3,776,277 | 12/1973 | Nagashima | 251/30 X |
| 3,974,849 | 8/1976 | Dawson | 251/30 X |
| 4,070,001 | 1/1978 | Musgrove | 251/46 |

Primary Examiner—Larry Jones

Attorney, Agent, or Firm—Sughrue, Mion, Zinn Macpeak & Seas

[57] ABSTRACT

A valve which opens on reduced pressure comprises: a hollow body (1) divided into first and second portions (2 and 3) by an internal partition (4), with the first portion being provided with a first opening (5) for connection to an enclosure to be evacuated and with a second opening (6) for connection to the aspiration side of a vacuum pump; a moving valve plate (7) disposed inside the first portion; a spring (8) urging the valve plate to close the first opening; a rod (10) having one end connected to the valve plate and passing through the internal partition; and a piston (b 11) which is connected to the other end of the rod, and which divides the second portion into a first chamber (13) and a second chamber (14) which are sealed from each other, the first chamber being on the rod side of the piston and being in communication with the outside (19), and the second chamber including an orifice (22) for communication with the outside, which orifice is fitted with closure means (23), the second chamber further including means (20) putting the second chamber in communication with the first portion of the body.

4 Claims, 3 Drawing Figures (56)

VALVE WHICH IS OPENED BY REDUCED PRESSURE

The present invention relates to a reduced pressure valve for isolating a vacuum enclosure from a vacuum pump.

BACKGROUND OF THE INVENTION

To ensure the valve provides adequate sealing, the valve plate must be thrust with high pressure against the valve seat, and as a result the moving member of the valve must be driven by powerful means.

For example, one prior art reduced pressure valve essentially comprises: a hollow body divided into first and second portions by an internal partition, with the first portion being provided with a first opening for connection to an enclosure to be evacuated and with a second opening for connection to the aspiration side of a vacuum pump; a moving valve plate disposed inside the first portion; a spring urging the valve plate to close the first opening; a rod having one end connected to the valve plate and passing through the internal partition; and a piston which is connected to the other end of the rod, and which divides the second portion into a first chamber and a second chamber which are sealed from each and being in communication with the outside.

To open this prior art valve, an auxiliary vacuum pump is required, e.g. a membrane pump, together with its drive motor to overcome the force of the spring which force may be large.

This equipment thus requires bulky auxiliary equipment which may occupy two to three times the volume of the valve itself.

Preferred implementations of the present invention mitigate this drawback and provide a valve which operates on reduced pressure without requiring bulky auxiliary equipment.

SUMMARY OF THE INVENTION

The present invention provides a valve which opens on reduced pressure and which comprises: a hollow body divided into first and second portions by an internal partition, with the first portion being provided with a first opening for connection to an enclosure to be evacuated and with a second opening for connection to the aspiration side of a vacuum pump; a moving valve plate disposed inside the first portion; a spring urging the valve plate to close the first opening; a rod having one end connected to the valve plate and passing through the internal partition; and a piston which is connected to the other end of the rod, and which divides the second portion into a first chamber and a second chamber which are sealed from each other, the first chamber being on the rod side of the piston and being in communication with the outside, and the second chamber including an orifice for communication with the outside, which orifice is fitted with closure means, the second chamber further including means putting the second chamber in communication with the first portion of the body.

Thus, by virtue of the invention, the power required for opening the valve to overcome the force of the spring is supplied by the vacuum pump itself. All that needs to be done to open the valve is close the said closure means associated with the said orifice for putting the second chamber in communication with the outside. This requires little power, and a solenoid much smaller than the valve itself may be used for the purpose. The solenoid is powered at the same time as the vacuum pump is put into operation.

In a preferred embodiment of the invention, the said communication between the second chamber and the first portion of the body is provided by a channel provided through the said rod and opening out in the second chamber at a point projecting beyond the said piston.

Preferably, when the valve is open, said point at which the channel opens out in the second chamber is closed by abutment against sealing means.

This ensures that the solenoid is not subjected to too great a pressure difference between the atmosphere and the pressure in the second chamber. Thus, once the valve is open, the second chamber is no longer connected to the vacuum pump so the solenoid may be of limited power, and thus of limited size.

BRIEF DESCRIPTION OF THE DRAWINGS

An embodiment of the invention is described by way of example with reference to the accompanying drawings, is which.

MORE DETAILED DESCRIPTION

Figure 1:
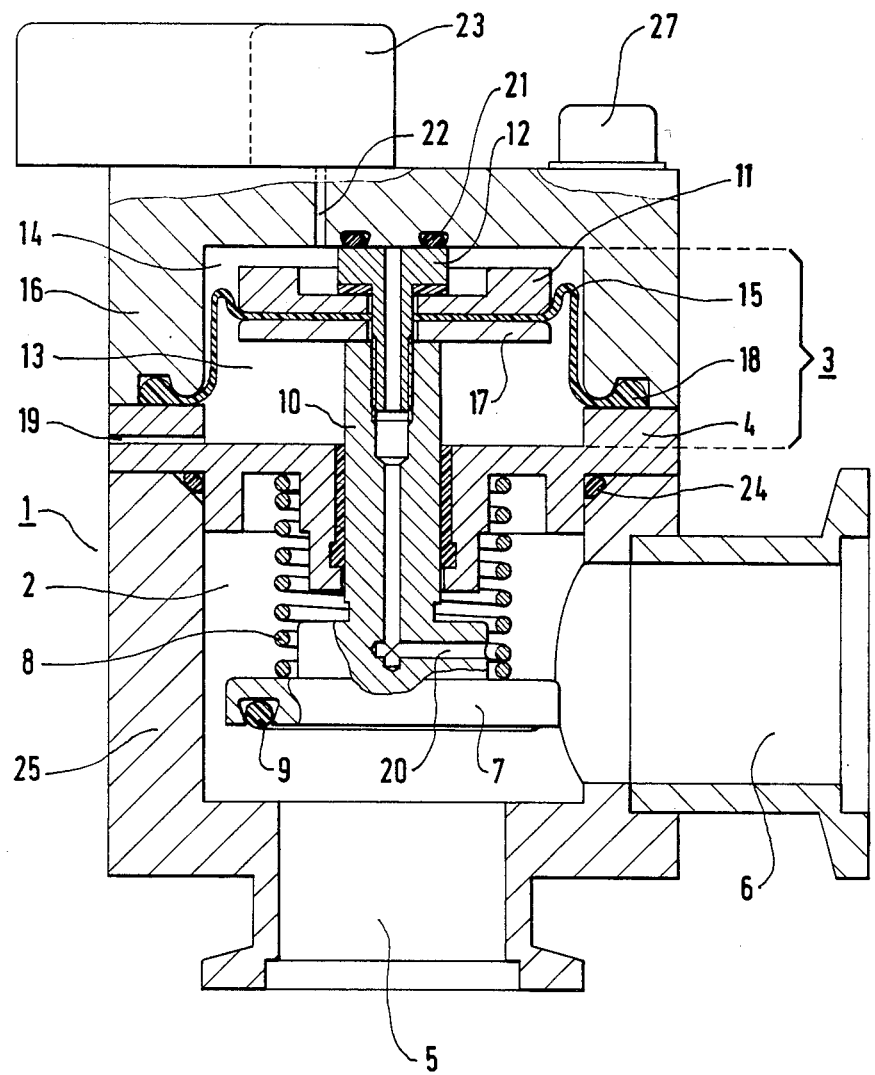
FIG. 1 is an axial section through a valve in accordance with the invention, with its valve plate shown in the open position.

A valve in accordance with the invention comprises a hollow body 1 which is divided into first and second portions 2 and 3 by an internal partition 4.

The first portion 2 has a first opening 5 for connection to an enclosure to be evacuated, and a second opening 6 for connection to the aspiration side of a vacuum pump.

A moving valve plate 7 is disposed inside the first portion 2 and is subjected to the thrust of a spring 8.

When the valve is closed, the valve plate 7 closes the opening 5. An O-ring 9 ensures a gastight seal.

The valve plate 7 is fitted to one end of a rod 10 which passes through the internal partition 4 in a sealed manner such that the passage through the partition acts as a sliding bearing for axial displacement of the valve plate 7.

In the second portion 3 there is a piston 11 which is connected to the other end of the rod 10 by a screw 12.

The piston 11 divides the second portion 3 into a first chamber 13 and a second chamber 14. The first and second chambers are sealed from each other by an annular elastomer membrane 15 having its outer periphery clamped between the partition 4 and a cover 16 of the body, and having its inner periphery clamped between the piston 11 and a washer 17.

The membrane includes an integral sealing ring 18 at its outer periphery to provide an airtight seal between the internal portion 3 of the body and the outside atmosphere.

The first chamber 13 is put into communication with the the outside via an orifice 19.

The first portion 2 of the body is put into communication with the second chamber 14 of the second portion 3 of the body by means of a channel 20.

The channel 20 comprises a horizontal portion (as drawn) passing radially through the upper portion of the valve plate 7 to reach its axis, and a vertical axial portion running along the rod from said first horizontal portion of the channel up to an opening into the second chamber 14. The channel 20 opens out into the second chamber via a hole in the head of the screw 12. When the valve is in the open position, this screw head opening is pressed against a sealing ring 21 in the top of the second chamber 14, thereby blocking communication between the second chamber 14 and the first portion 2 of the body. The second chamber 14 also includes communication with the outside by means of a channel 22 made through the body cover 16. The channel 22 is provided with closure means, and in the present example with a solenoid-operated valve 23.

The valve 23 is powered at the same time as the vacuum pump connected to the opening 6 is powered, thereby closing the channel 22.

A sealing ring 24 is interposed between the partition 4 and the lower portion 25 of the body 1 to provide an air tight seal between the first portion 2 of the body 1 and the outside atmosphere.

Screws 26 and 27 clamp the entire assembly together.

Figure 2:
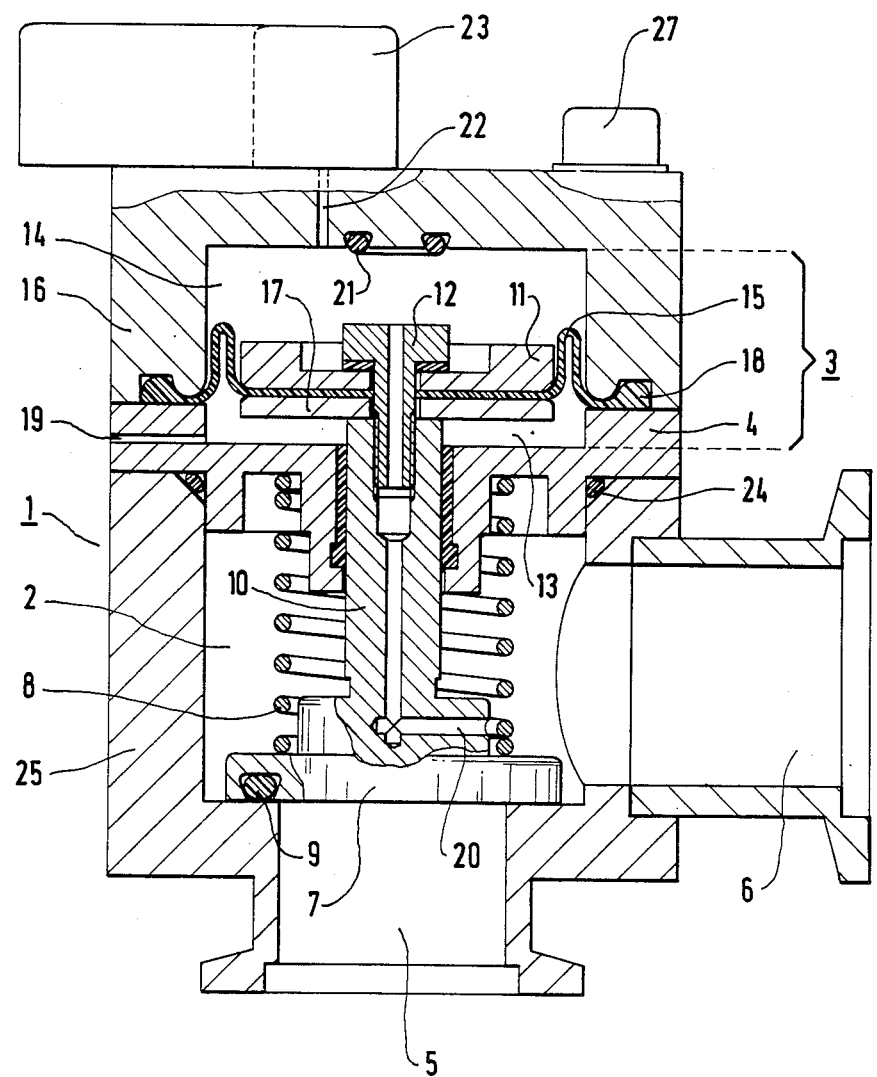
FIG. 2 is a similar axial section which shows the same valve in the closed position.
Figure 3:
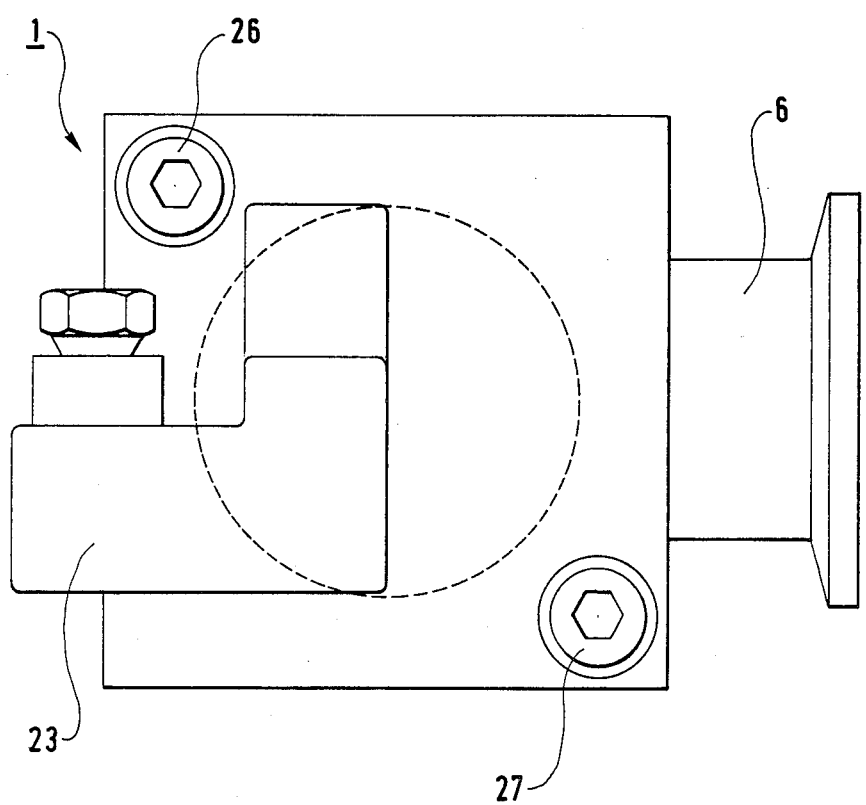
FIG. 3 is a plan view of the same valve.

The valve operates as follows:

In the closed position shown in FIG. 2, the valve plate 7 bears against its seat, thereby closing the opening 5. The channel 20 provides communication between the first portion 2 and the second chamber 14. Both of these volumes are at atmospheric pressure because the channel 22 is open since the solenoid for actuating the valve 23 is unpowered. The first chamber 13 is also at atmospheric pressure via the orifice 19. The spring 8 urges the valve plate 7 against its seat.

When the vacuum pump connected to the opening 6 is started, power is also applied to the solenoid to close the valve 23 and thus close the channel 22. The vacuum pump then evacuates the first portion 2, and thus evacuates the second chamber 14 via the channel 20. Since the first chamber 13 remains under atmospheric pressure, there come a moment when the pressure is imbalance on the two faces of the piston 11 is sufficient to force the piston upwards against the force of the spring 8. The valve plate 7 is thus opened, and once it reaches its high position the head of the screw 12 bears against the sealing ring 21, thus closing the channel 20, and disconnecting the second chamber 14 from the vacuum pump. While such closure of the channel 20 is not essential, it presents the advantage, once the valve has opened, of avoiding too great a pressure reduction in the second chamber 14, which in turn avoids the need for the solenoid-operated valve 23 to be capable of withstanding a full vacuum. This means that a smaller, less powerful and less bulky solenoid-operated valve can be used than would otherwise be possible.

The valve is closed by interrupting the power supply to the solenoid, thereby opening the channel 22 and returning the second chamber 14 to atmospheric pressure.

The pressure difference between the first and second chambers 13 and 14 then drops to zero and the spring 8 returns the valve plate 7 to close the opening 5.

Such a valve is particularly useful for isolating an enclosure to be evacuated, from a primary vacuum pump such as a vane pump. The channel 20 which serves to return the valve to the closed position when the pump stops, also returns the suction side of the pump to atmospheric pressure which can avoid various problems associated with the operation of such pumps.

In addition, only a small solenoid-operated valve is needed to open the main valve.

For example, an 11 watt valve 23 is sufficient for use with a main valve that is associated with a primary vacuum pump.

It is also possible to use such a valve in association with a secondary vacuum pump, in spite of the fact that the channel 20 momentarily puts the vacuum in communication with atmosphere prior to the valve plate 7 being properly engaged on its seat. Such use requires the spring 8 to be is a stiffer spring than is necessary for a primary vacuum application, to ensure that the duration of the "momentary" communication is short, and also requires the channel 20 to be of small section while the secondary vacuum enclosure is of large volume.

We claim:

1. A valve which opens on reduced pressure, said valve comprising:
    a hollow body;
    an internal partition dividing said hollow body into first and second portions;
    a first opening within said hollow body first portion for connection to an enclosure to be evacuated, and
    a second opening within said hollow body first portion for connection to the aspiration side of a vacuum pump;
    a moving valve plate disposed inside the hollow body first portion;
    a spring operatively engaging said valve plate for urging said valve plate in a direction to close the first opening;
    a rod having one end connected to the valve plate and slidably, sealably passing through the internal partition;
    a piston connected to the other end of said rod within said hollow body second portion for dividing the second hollow body portion into a first chamber and a second chamber which are sealed from each other, the first chamber being on the rod side of the piston,
    means for placing said first chamber in communication with the outside, an orifice within said hollow body for communicating said second chamber with the outside,
    closure means for said orifice, and
    means for placing said second chamber in communication with the first portion of the hollow body.

2. A valve according to claim 1, wherein said means communicating the second chamber with the first portion of the hollow body comprises a channel provided within said rod and opening out in the second chamber at a point projecting beyond said piston.

3. A valve according to claim 2, wherein said hollow body second portion carries internal sealing means such that, when the valve is open, said point at which the channel opens out in the second chamber is closed by abutment against said sealing means.

4. A valve according to claim 1, wherein the means for closing the orifice providing communication between the second chamber and the outside comprises an electrically-actuated valve for simultaneous energization with the vacuum pump.

* * * * *